US007868480B2

(12) United States Patent
Miles

(10) Patent No.: US 7,868,480 B2
(45) Date of Patent: Jan. 11, 2011

(54) SATURATING SERIES CLIPPER

(75) Inventor: Peter R. Miles, Wetherby (GB)

(73) Assignee: Eldon Technology Limited, Steeton (GB)

( * ) Notice: Subject to any disclaimer, the term of this patent is extended or adjusted under 35 U.S.C. 154(b) by 80 days.

(21) Appl. No.: 12/345,213

(22) Filed: Dec. 29, 2008

(65) Prior Publication Data

US 2010/0164448 A1 Jul. 1, 2010

(51) Int. Cl.
*H02J 1/10* (2006.01)

(52) U.S. Cl. .......................................... 307/43; 307/52

(58) Field of Classification Search .................. 307/43, 307/52; 323/281

See application file for complete search history.

(56) References Cited

U.S. PATENT DOCUMENTS

| | | | | |
|---|---|---|---|---|
| 5,559,423 A * | 9/1996 | Harman | ...................... | 323/277 |
| 6,188,211 B1 * | 2/2001 | Rincon-Mora et al. | ...... | 323/280 |

* cited by examiner

*Primary Examiner*—Shawn Riley
(74) *Attorney, Agent, or Firm*—Dorsey & Whitney LLP

(57) ABSTRACT

A clipper circuit for regulating an unregulated or semi-regulated output of a power supply unit. The circuit includes a gate element between the load and the input voltage from the power supply unit. The gate is activated by a comparing circuit, which turns the gate on or off based on the feedback voltage of the circuit output, compared with a reference voltage. The gate is in saturation mode during normal and heavy loading and in linear mode during light loading.

12 Claims, 7 Drawing Sheets

SATURATING SERIES CLIPPER

FIELD OF THE INVENTION

This invention relates in general to voltage regulation and, more specifically, to voltage regulation for power supply units.

BACKGROUND

Many electronic devices use a multi-output power supply unit (PSU) to provide power to a number of circuits and electrical components. The power supplied should be regulated to insure that the components operate correctly and are not damaged by an overload of excessive volts. If one output of a PSU is connected to a varying load, the output typically should be regulated to prevent significant voltage changes. If a PSU has one well regulated output connected to a varying load, the voltages seen at the other outputs may often rise significantly. As an example, if a regulated 5 volt output is heavily loaded, a semi-regulated output ordinarily at 12 volts may rise to 24 volts or more, representing 200%+ of the nominal voltage. This voltage difference may damage certain electrical components and even the entire device connected to the output. For example, if a hard drive in a personal computer is powered by a 12 volt output rail from a PSU and the hard drive is switched to standby mode, the load on that rail will generally decrease. This decreases the current drawn by the load, thereby causing the rail's output voltage to rise. Should the output voltage increase to more than 10% above nominal or even double to 24 volts, it may overload some components of the hard drive and the hard drive may fail.

There are several options currently available to more accurately regulate the output voltage of a multi-output power supply. One is to add a post regulator to the semi-regulated output. However, this type of regulator often takes up a large amount of space on a circuit board, adds complexity to the circuit, may be inefficient as it generates a significant amount of heat and can be expensive to implement. Another option is to add a pre-load resistor to the semi-regulated output. This option can be relatively inefficient as it also generates a substantial amount of heat, which wastes energy and raises the overall temperature of the circuit. A third option is to implement a more expensive transformer as part of the PSU. This is often more efficient than the first two options, but may not be feasible for low-cost electronics as it significantly raises the cost of the PSU circuit. Still another option is to add an electronic magnetic regulator to the semi-regulated output. However, the regulator may not work over a wide load range as it has a slow response to sag and surge conditions and is sensitive to a lagging power load factor.

SUMMARY

A clipper circuit for regulating the non-regulated or semi-regulated output voltage of a PSU. The clipper circuit includes a gate element between the load output and the input voltage from the PSU. The gate is saturated during normal and heavy loading, producing an output voltage equal to the input voltage and dissipating very little power. The gate is linear during light loading, producing a voltage output which is kept within limits acceptable to the load and is lower than the input voltage. This combination provides a regulated voltage output to the load, regardless of the loading conditions. The gate is controlled by a comparing element, which turns the gate on or off based on the feedback voltage of the circuit output compared with a reference voltage. In one embodiment, the reference voltage is a programmed value within the element. In a second embodiment, the reference voltage is an external input to the comparing element.

DETAILED DESCRIPTION

One embodiment of the invention includes a clipper circuit for "clipping" high voltage values from a PSU. The clipper circuit regulates the voltage supplied by a semi-regulated output of a multi-output PSU. This allows the semi-regulated output to be used for a load requiring accurate regulation, without the use of a post regulator circuit or a preload resistor. The clipper circuit is connected between a PSU and a load such that it connects to the output voltage rails of the PSU and to the load through at least one output voltage rail.

The clipper includes a gate which regulates the voltage output to the load, keeping the voltage regulated within the designated value. The voltage of the gate is controlled by a comparing element or circuit, which compares the output voltage at the load to a reference voltage. Under light loading conditions the comparing element reduces the voltage of the gate, shifting the gate into linear mode. In linear mode the voltage output of the clipper circuit remains constant as the voltage input to the gate increases. Further, the voltage output of the circuit remains constant, although the load is drawing less current than under normal or heavy loading conditions. In contrast, under light loading conditions, the resistance of the gate increases as the load current is reduced, thereby keeping the power dissipated by the gate relatively low. Under normal or heavy loading conditions the comparing element raises the controlling voltage of the gate, pushing it to saturation. When in saturation, the output voltage of the gate remains the same as the input voltage. Additionally, under heavy or normal loading, the load is powered by the output from the PSU, thus keeping the power dissipated by the gate small.

Figure 1:
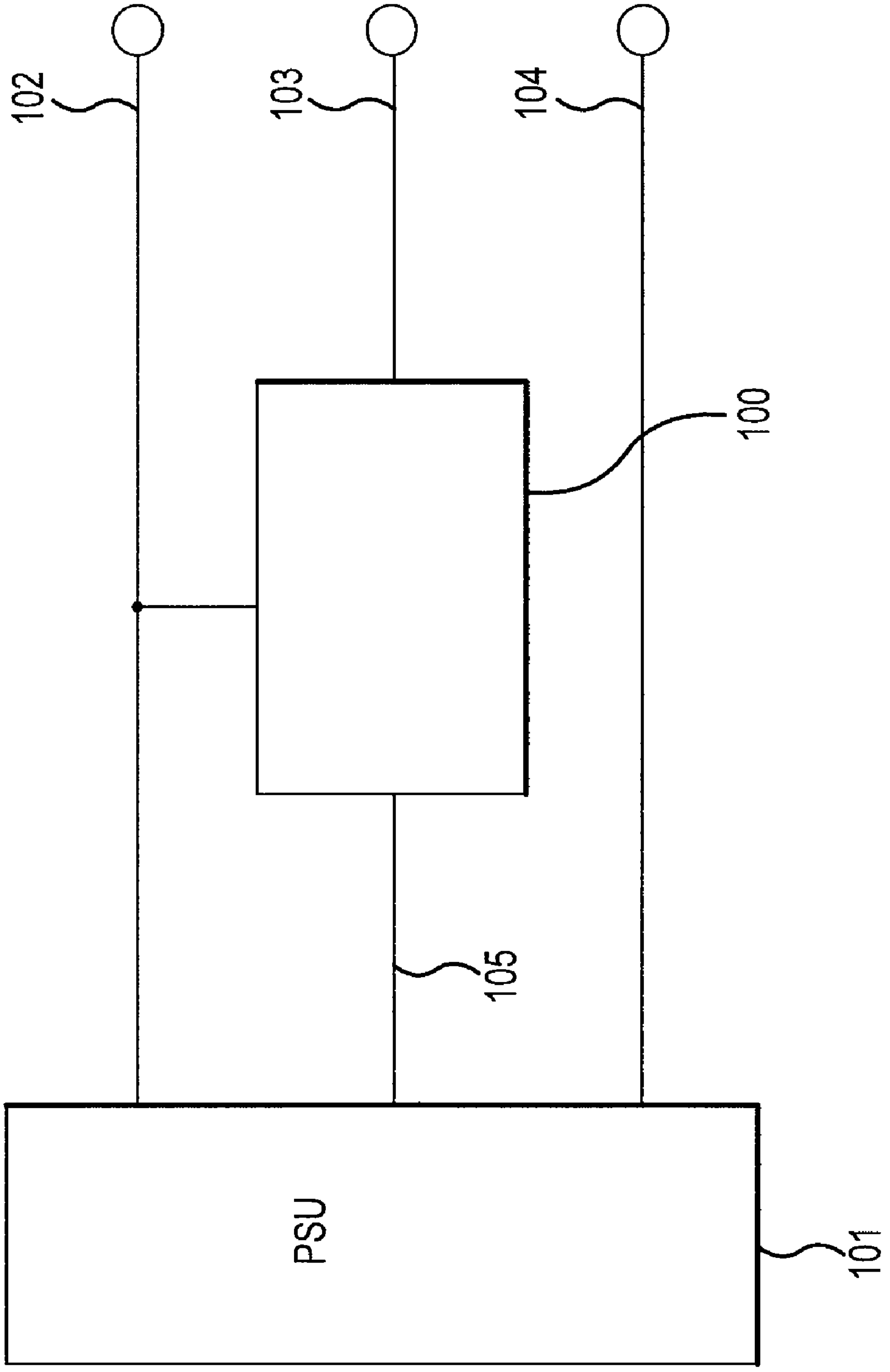
FIG. 1 is a block diagram of the clipper circuit connected to the PSU.

Referring now to FIG. 1, a PSU may have three outputs such as a first voltage rail 102, a second voltage rail 105 and a third voltage rail 104. A clipper circuit 100 is connected to the PSU 101 via the first 102 and second 105 voltage rails. The first and third voltage rails 102, 104 provide power directly to a load (not shown) while the second voltage rail 105 provides power to the series clipper 100, which then provides power to a load through an output voltage rail 103. Additionally, the third output rail 104 may be well regulated while the first and second output rails 102, 105 may be unregulated or semi-regulated. In the embodiment shown, the use of the clipper 100 between the second output rail 105 and the load may ensure that load will receive a regulated voltage as the output voltage rail 103 provides the power to the load.

Figure 2:
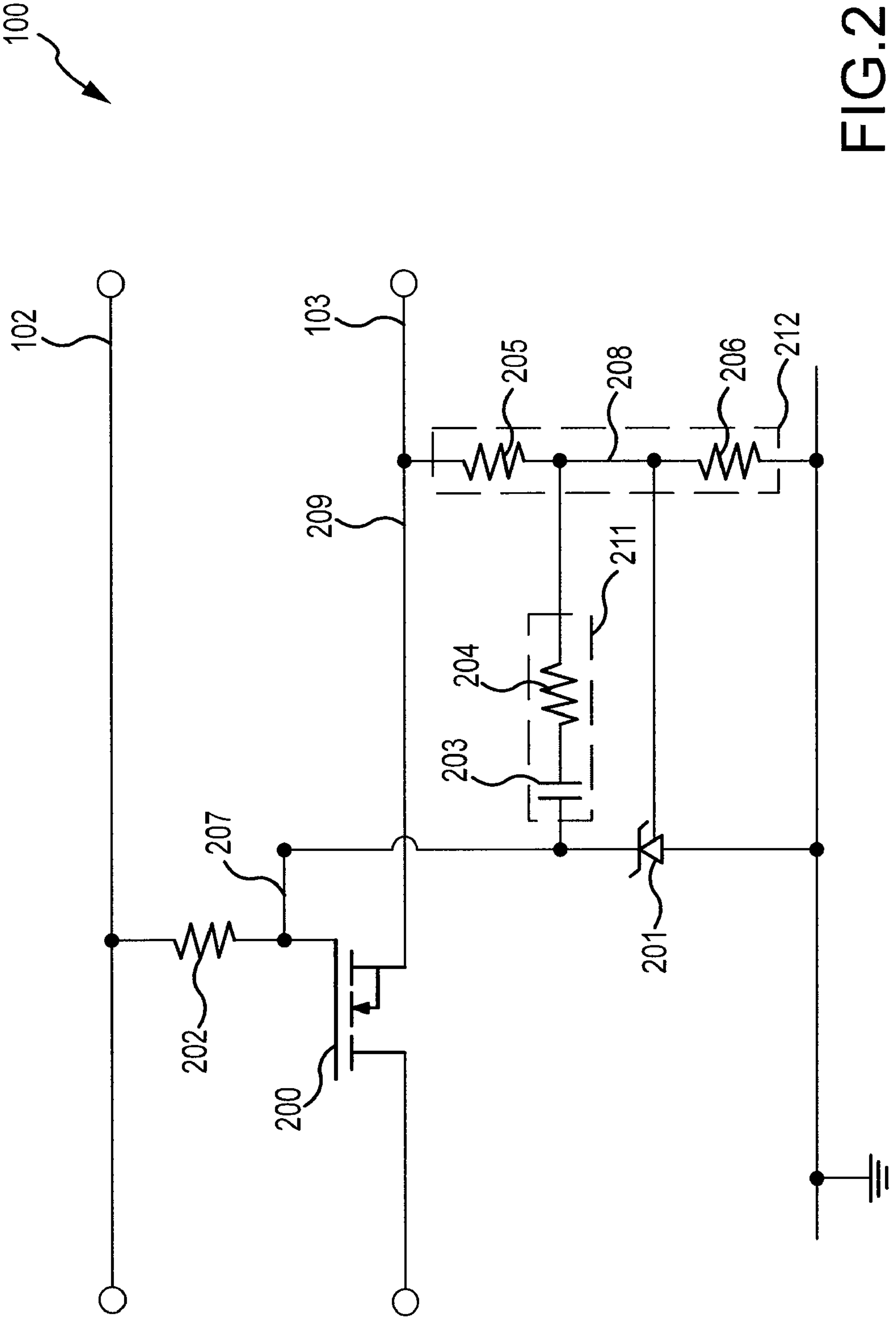
FIG. 2 is circuit diagram of one embodiment of the clipper circuit.

Referring now to FIG. 2, the series clipper 100 includes a gate 200, connecting resistor 202, shunt regulator 201, compensation circuit 211, and voltage divider 212. The connecting resistor 202 connects the first voltage rail 102 to the gate 200, the shunt regulator 201 and the compensation circuit 211 through a gate node 207. The voltage divider 212, shunt regulator 201 and compensation circuit 201 are connected at the feedback node 208. The shunt regulator 201 and the voltage divider 212 are connected to ground. The voltage divider 212 and the gate 200 determine the output voltage to rail 103 via the output node 209.

The first voltage rail 102 should be higher than second voltage rail 105 by enough volts to turn on the gate 200 into saturation. Additionally, the value of the connecting resistor 202 may be set according to the requirements of the system. For example, if the first voltage rail 102 is set at 21-32 volts and the second voltage rail 105 is set to 11.5-21.5 volts the connecting resistor may be in the range 3 kilo-ohms to 15 kilo-ohms.

The gate 200 and may be any device capable of switching between different states and producing different output characteristics with the capability of also operating in the linear region. Alternative embodiments may use a BJT, JFET, IGFET, IGBT or any other type of transistor for the gate, as required. Additionally, the shunt regulator 201 in this embodiment is a TL431 shunt regulator. However, the shunt regulator 201 may be a, transistor or series of transistors, or a series of MOSFETs or JFETs. The shunt regulator 201 typically has an internal reference voltage value. When the voltage input into the shunt regulator 201 is higher than the internal reference voltage, the shunt regulator 201 turns on. Similarly, when the voltage is lower than the internal reference voltage, the shunt regulator 201 turns off. However, in another embodiment, the shunt regulator 201 may be a Zener diode combined with a bipolar junction transistor programmed to conduct current at certain voltage levels, rather than comparing two voltage values. The shunt regulator 201 raises and lowers the voltage level of the gate node 207, which in turn determines the state of the gate 200. For example, when the gate node 207 voltage is low the gate 200 is turned off, when the voltage is high the gate 200 is in linear mode and, finally, when the voltage is the near its peak the gate 200 is in saturation mode.

The compensation circuit 211 may be any element or combination of elements that conducts current, such as a resistor, diode, capacitor, inductor, transistor, and so forth, in order to determine the frequency response of the shunt regulator 201. In one embodiment the compensation circuit 211 includes a capacitor 203 and a resistor 204 connected in series. The capacitor 203 is connected to the gate node 207 and the resistor 204; the resistor 204 is further connected to the feedback node 208 and the capacitor 203. The compensation circuit 211 elements may have any resistive and/or capacitive values necessary for the intended operation of the system. For example, if the first voltage rail 102 is set to vary from 21 to 32 volts and the second voltage rail 105 is set to range from 11.5 to 21.5 volts, the resistor 204 may be 3.3 kilo-ohms and the capacitor 203 may be 100 nano-farads.

The voltage divider 212 may be any element or combination of elements that produces a voltage at the feedback node 208 related to the voltage of the output node 209. The voltage divider 212 in this embodiment is a combination of two resistors connected in series. The first resistor 205 is connected to the output node 209 and the feedback node 208; the second resistor 206 is connected to ground and the feedback node 208. The resistors may be any value depending on the desired output voltage of the system. In order to minimize the dissipation in gate 200, these resistors should be chosen such as to keep the output voltage as high as possible, consistent with not supplying excess volts to the load connected to voltage rail 103. For example, if an output rail voltage at 103 no greater than 12.8V. is desired, the first voltage divider resistor 205 may be 10 kilo-ohms and the second voltage divider resistor 206 may be 2.49 kilo-ohms. The voltage divider 212 provides a feedback voltage for the shunt regulator 201, thus enabling the shunt regulator 201 to turn on or off depending on the feedback from the output.

The gate node 207 determines whether the gate 200 is in saturation mode, linear mode or is off. The first voltage rail 102 provides a voltage to the gate node 207 via the connecting resistor 202 and the gate node 207 voltage level is controlled by the shunt regulator 201. When the shunt regulator 201 is in the "on" state, current from the gate node 207 is shunted through the shunt regulator 201, thereby reducing the voltage level of the gate voltage node 207. The gate 200 will transition to linear mode if it has been in saturation mode. Likewise, if the gate input voltage drops below the activating voltage, the gate 200 will turn off. When the shunt regulator 201 is in the "off" state, the compensation circuit 211 no longer draws current and the voltage at the gate node 207 rises. The gate 200 may then transition either from linear to saturation mode, or from off to its linear mode, depending on the gate voltage level.

The shunt regulator 201 turns on or off by comparing the voltage at the feedback node 208 with an internal reference voltage. For example, the shunt regulator 201 transitions to the on state when the feedback node voltage 208 is higher than the reference voltage level within the shunt regulator 201. Similarly, the shunt regulator 201 turns off when the voltage at the feedback node 208 is lower than the reference voltage of the shunt regulator 201. As the voltage value at the feedback node 208 is a function of the voltage at the output node 209, it allows the shunt regulator 201 to turn off when the voltage of the load decreases and turn on when the voltage of the load increases. During normal and heavy loading conditions the gate 200 is typically saturated. During light loading conditions the gate 200 is generally linear, thus regulating the output voltage.

Figure 2A:
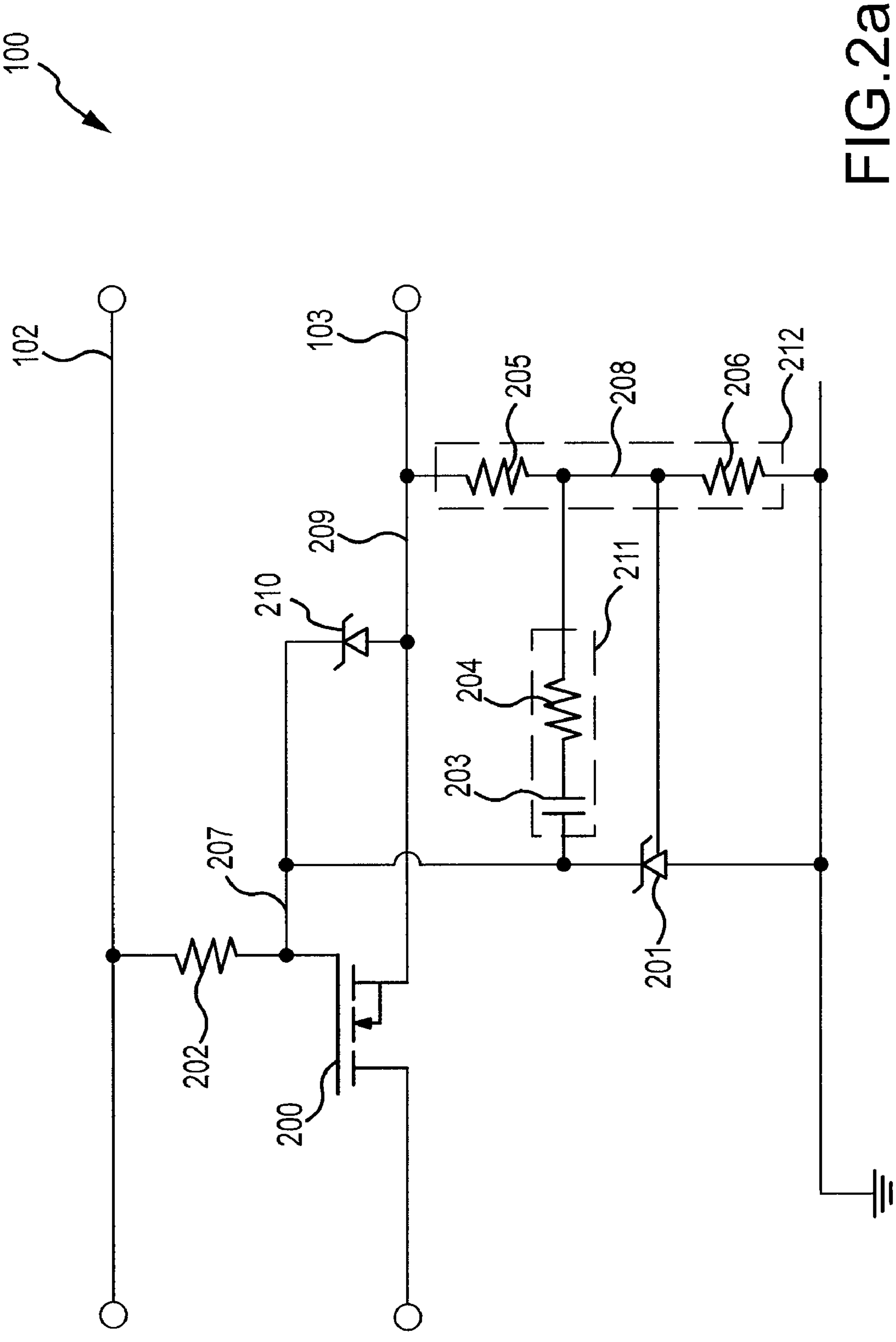
FIG. 2*a* is a circuit diagram of the first embodiment of the clipper circuit implemented with internal fault protection.

The embodiment illustrated in FIG. 2 may also include a diode or other component for protecting against fault conditions. For example, in FIG. 2*a* a fault diode 210 is electrically connected in parallel with the gate 200. This protects (or assists in protecting) the gate 200 from an excessive voltage due to a short circuit at the output voltage rail 103. As there may be other fault protections within the PSU 101, the fault diode 210 is not necessary for the clipper circuit 100 to accurately regulate voltage. However, in some instances (for example if the PSU does not have other fault protection elements), it may be useful to provide a diode or other electrical element to protect the electrical components of the clipper circuit 100.

Figure 3:
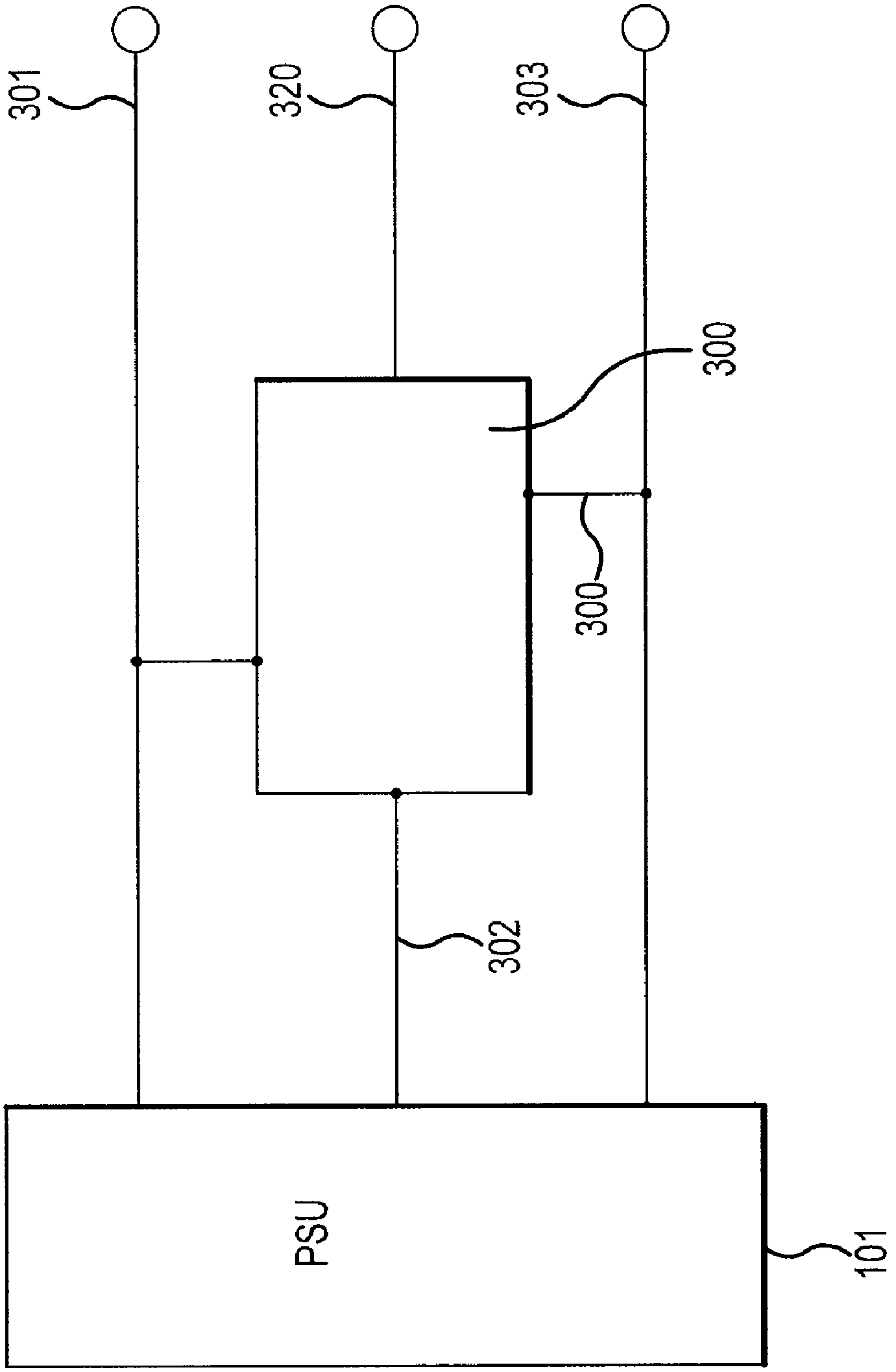
FIG. 3 is a block diagram of a second embodiment of the clipper circuit.

FIG. 3 illustrates a block diagram of a second embodiment of the invention. The PSU 101 has multiple outputs connected as voltage rails 301, 302, 303 to a load. The first and second voltage rails 301, 302 are semi-regulated and the third voltage rail 303 is generally fully regulated. A clipper circuit 300 connects to the first and third rails 301, 303 and regulates the second voltage rail 302 by producing a separate output rail 320 connected to a load.

Figure 3A:
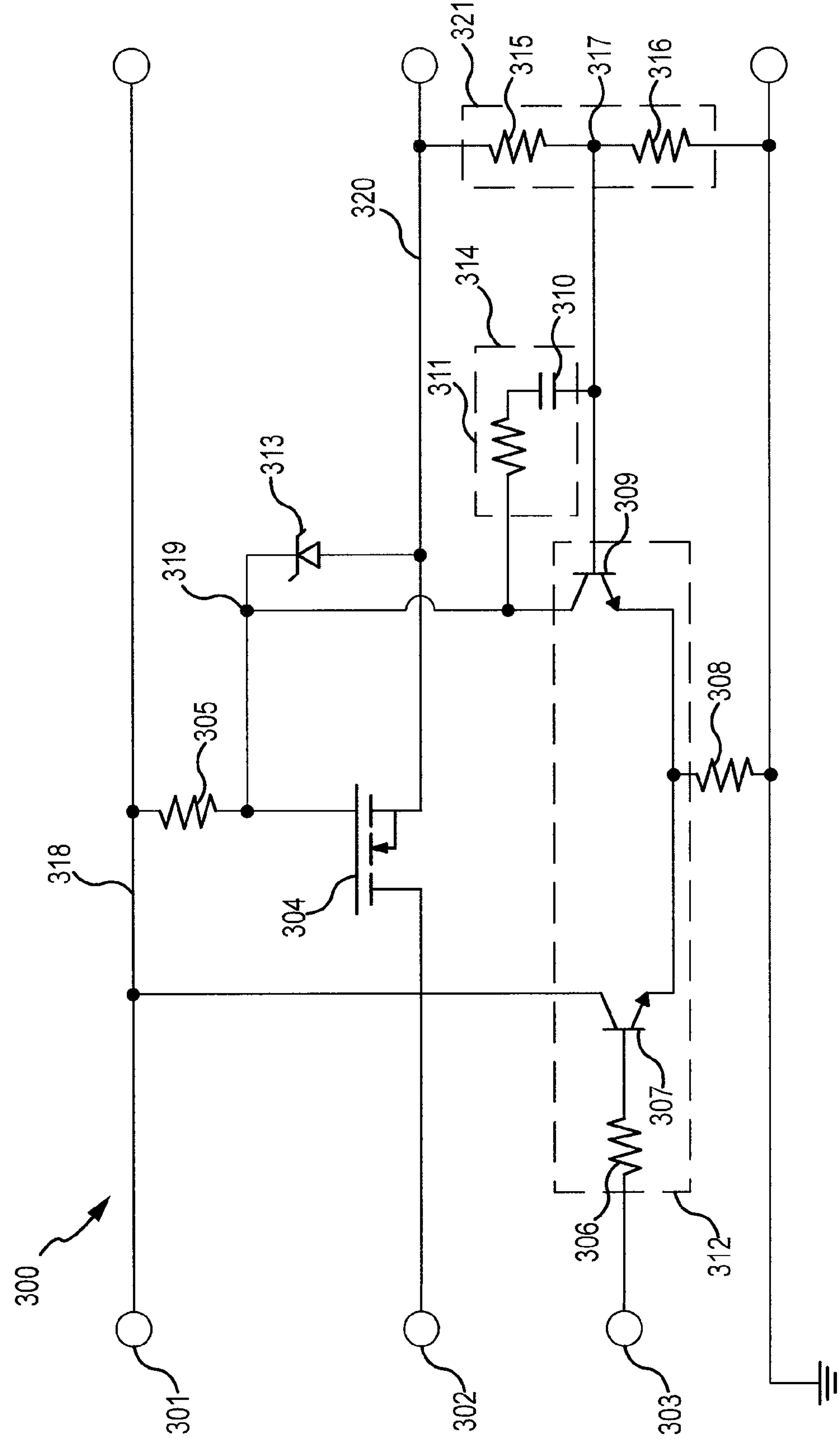
FIG. 3*a* is a circuit diagram of the second embodiment of the clipper circuit.

FIG. 3*a* illustrates the clipper circuit 300, the circuit includes a gate 304, connecting resistor 305, reference resistor 306, comparing circuit 312, fault diode 313, compensation circuit 314, voltage divider 321, input node 302, powering node 301, gate node 319, feedback node 317 and an output node 320. The first voltage rail 301 is connected to the connecting resistor 305 and the comparing circuit via the powering node 318. The second voltage rail 302 connects to the output node 320 via the gate 304. The gate node 319 connects the connecting resistor 305, the comparing circuit 312, the fault diode 313 and the gate 304. The output node connects to the fault diode 313, and the voltage divider 321.

The connecting element 305, reference element 306 and grounding element 308 may be any electrical elements that control current flow. In this embodiment, all three are resistors. Additionally, the value of the connecting resistor 305, reference resistor 306 and grounding resistor 308 may be set to any value depending on the requirements of the system. For example, if the first voltage rail 301 is set at 21-32 volts, the second voltage rail 302 is set to 11.5-21.5 V and the third voltage rail is set to 5V, the connecting resistor 305 may be 10 kilo-Ohms, the reference and grounding resistors 306, 308 may be 1 kilo-Ohm. The connecting resistor 305 provides the voltage from the first rail 301 to the gate node 319. The reference resistor 306 provides the voltage from the third rail 303 to the comparing circuit 312. And the grounding resistor 308 provides a current path from the comparing circuit 312 to ground.

The gate 304 may be any device capable of switching between different states and producing different output characteristics with the capability of also operating in the linear region. In this embodiment the gate 304 is a MOSFET transistor, but alternative embodiments may use a BJT, JFET, IGFET, IGBT or any other type of transistor. The gate 304 has multiple states: off, saturation and linear, each state includes a different output characteristic. The output voltage of the clipper circuit 300 depends on the state of the gate 304. For example, when the gate 304 is in linear mode the clipper circuit 300 acts as a linear regulator and the output voltage is related to the voltage at gate node 319. When the gate 304 is saturated, the output voltage is determined by the input voltage from the second rail 302 and is unrelated to the voltage at gate node 319.

The comparing circuit 312 compares the voltage at the feedback node 317 with a reference voltage. The reference voltage in one embodiment is the third voltage rail 303, however this may be an internal voltage to the circuit or another input. The comparing circuit 312 includes the reference resistor 306, the grounding resistor 308, a reference transistor 307 and a divider transistor 309. The comparing circuit activates the gate 304 by lowering and raising the voltage at the gate node 319. For example, when the feedback node voltage 317 is higher than the reference voltage received from the third rail 303, the divider transistor 309 turns on. When the divider transistor 309 is on, current is diverted away from the gate 304, lowering the gate node voltage 319 which switches the state of the gate 304. When the feedback voltage 317 is lower than the reference voltage received from the third rail 303, the divider transistor 309 turns off and current is no longer diverted from the gate node 319. The voltage of the gate node 319 rises and the gate 304 switches states.

The compensation circuit 314 may include a resistor 310 and a capacitor 311 connected in series. The resistor 310 is connected to the gate node 319 and to the capacitor 311; the capacitor 311 is connected to the resistor 310 and to feedback node 317. The compensation circuit 314 elements may be designed in any range of values, depending on the requirements of the system. For example, if the first voltage rail 301 is set at 21-32 volts, the second voltage rail 302 is set to 11.5-21.5 V and the third voltage rail 303 is set to 5 V, the compensation circuit resistor 310 may be 1.5 kilo-Ohms and the compensation circuit capacitor 311 may be 10 nano-Farads. The compensation circuit 314 determines the frequency response of the comparing circuit 312.

The fault diode 313 may be any type of diode or electronic switch. The fault diode 313 in this embodiment is a Zener diode and is connected to the gate node 319 and the output node 320. It generally protects, or assists in protecting, the various electrical elements against a short circuit at the output voltage rail 320. As with the embodiment illustrated in FIG. 2, the fault diode 313 is a safety device and is not necessary for the clipper 300 to accurately regulate voltage. For instance, the PSU 101 may have another element designed to protect against short circuits, or another type of element within the clipper 300 may be used.

The voltage divider 321 may be any element or combination of elements that produces a voltage at the feedback node 317 related to the voltage of the output node 320. The voltage divider 321 in this embodiment is a combination of two resistors connected in series. The first resistor 315 is connected to the output node 320 and the feedback node 317; the second resistor 316 is connected to ground and the feedback node 317. The resistors may be any value, depending on the desired output voltage of the system. In order to minimize the dissipation in gate 304, these resistors should be chosen such as to keep the output voltage as high as possible, consistent with not supplying excess volts to the load connected to voltage rail 320 function and inputs of the system. For example, if an output rail voltage at 320 no greater than 12.8V. is desired, the first voltage divider resistor 315 may be 3.74 kilo-Ohms and the second voltage divider resistor 316 may be 2.49 kilo-Ohms. The voltage divider 321 provides a feedback voltage for the comparing circuit 312, such that the divider transistor 309 reduces or raises the voltage of the gate node 319 depending on the voltage provided by the voltage divider.

The gate node 319 determines whether the gate 304 is in saturation mode, linear mode or off. The first voltage rail 301 provides a voltage to the gate node 319 via the connecting resistor 305 and the gate node 319 voltage level is controlled by the comparing circuit 312. The comparing circuit 312 lowers the voltage of the gate node 319 during light loading conditions. When the feedback node voltage 317, which is related to the output load voltage, is higher than the reference voltage received from the third rail 303, the divider transistor 309 turns on. When the divider transistor 309 is on, current is diverted away from the gate 304, lowering the gate node voltage 319 switching the state of the gate 304 to either linear mode or off, depending on value of the voltage level. For example, if the gate was previously saturated, it will change to linear unless the voltage drops below the activating voltage of the gate 304, in which case the gate 304 will turn off. The comparing circuit 312 raises the voltage of the gate node 319 during normal or heavy loading conditions. When feedback voltage 317 is lower or equal to the reference voltage received from the third rail 303, the divider transistor 309 turns off and current is no longer diverted from the gate node 319. The voltage of the gate node 319 rises and the gate 304 switches states. The gate 304 will transition to saturation mode if it has been in linear mode, or if the gate had been off, it will transition to linear mode. In one embodiment, the gate 304 is saturated during normal and heavy loading conditions and is linear during light loading conditions.

Figure 4:
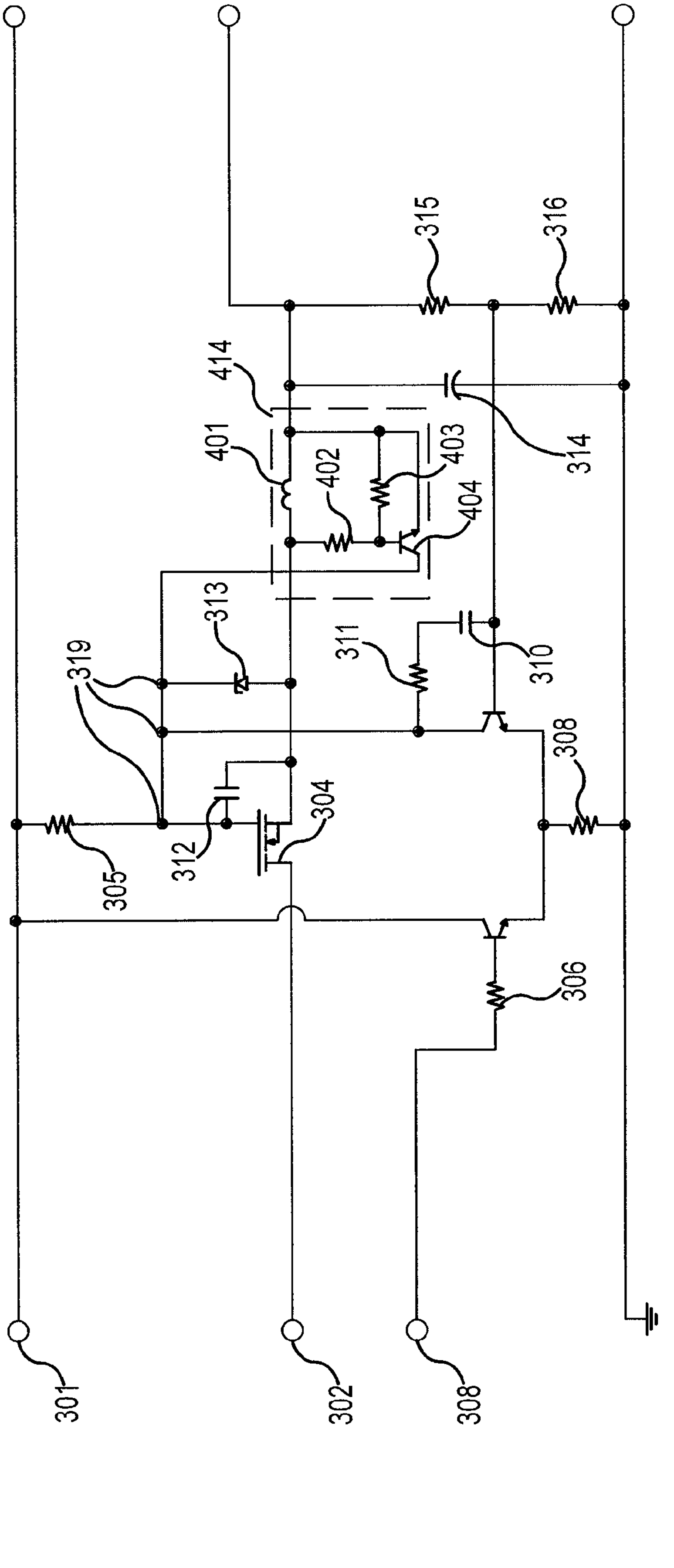
FIG. 4 is a circuit diagram of a third embodiment of the clipper circuit, implemented with internal fault protection.

FIG. 4 is another embodiment of the clipper circuit. In addition to the elements included within the previous embodiment (illustrated in FIG. 3*a*), this embodiment includes a fault protection circuit 414. This circuit 414 provides additional surge protection to prevent the transistors and other elements of the clipper circuit 303 from being damaged. The fault protection circuit 414 includes a fault inductor 401, a first fault resistor 402, a second fault resistor 403 and a fault transistor 404. The values for the fault protection circuit 414 elements may be designed at any values and will depend on the values of the other elements within the clipper circuit and the design tolerances of each device. In one embodiment, the first voltage rail 301 is set to 21-32V, the second voltage rail 302 is set to 11.5-21.5V and the third voltage rail 303 is set to 5V, the fault inductor 401 is set to 3.3 micro-Henry, the first fault resistor 402 is set to 330 Ohms, the second fault resistor is set to 1 kilo-Ohm and the fault transistor 404 is a BJT transistor. However, the fault transistor 404 may be any type of transistor or switching element as necessary or desired. When a short circuit or another type of current surge occurs, the increase in current may destroy the gate 304. However, the fault protection circuit 414 will prevent the current surge from damaging the gate. If there is an increase of current, the voltage of the fault inductor 401 increases. When the voltage across the inductor 401 increases, the first and second fault resistors 402, 403 provide a fraction of the voltage to the base of the fault transistor 404. The fault transistor 404 activates when the voltage applied to its base exceeds a predetermined fault value. When activated, the fault transistor 404 diverts current from the gate node 319, this in turns switches the gate 304 off and prevents the current spike from damaging it. The fault circuit 414 is not necessary for the clipper to accurately regulate, but it prevents damage and the required replacement of certain parts, specifically of the gate 304.

Figure 4A:
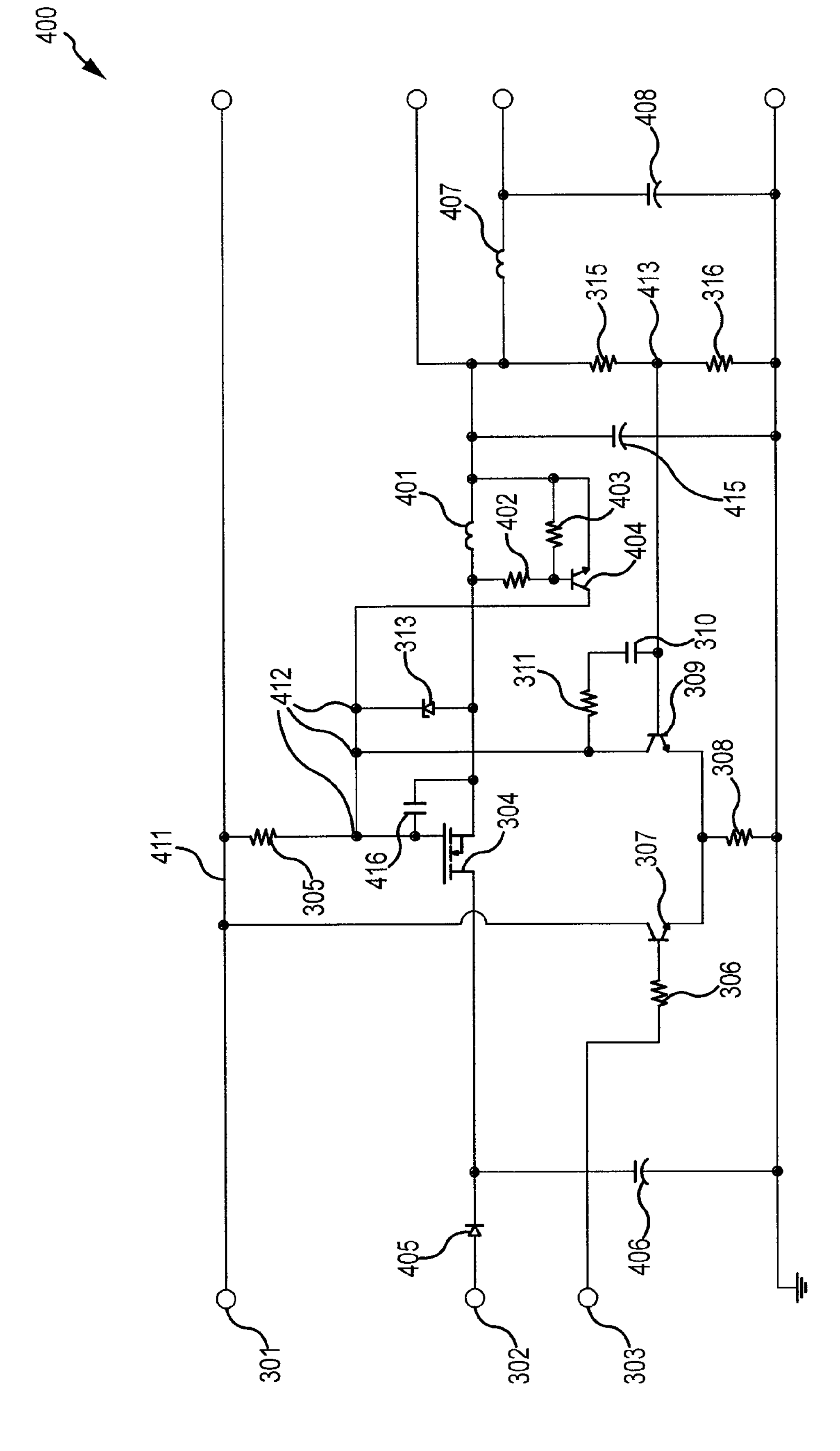
FIG. 4*a* is a circuit diagram of the third embodiment of the clipper circuit implemented for use with a fly-back power supply unit.

FIG. 4*a* is another embodiment of the clipper circuit illustrated in FIG. 4. The clipper circuit is implemented with a fly-back PSU. In addition to the fault protection circuit 414 discussed above with respect to FIG. 4, this embodiment includes an input diode 405, input capacitor 406, gate capacitor 416, feedback capacitor 415, output inductor 407 and an output capacitor 408. The input diode 405 is connected to the input voltage rail 302 from the PSU. The input diode 405 and input capacitor 406 connect to the PSU transformer and rectify the output to maintain a semi-regulated voltage input from the PSU. The input capacitor 406 and gate capacitor 416 reduce the noise present in the input signal and at gate node 412. The output inductor 407, feedback capacitor 415 and the output capacitor 408 reduce noise and unwanted frequencies in the output signal. The values of the input diode, input capacitor, feedback capacitor, gate capacitor, output inductor and output capacitor may be designed to be any value, depending on the requirements of the system. For example, if the first voltage rail 301 is set at 21-32 volts, the second voltage rail 105 is set to 11.5-21.5 V and the third voltage rail 303 is set to 5V, the input capacitor may be 1.5 mili-Farads, the gate capacitor may be 1.5 nano-Farads, the feedback capacitor may be 470 micro-Farads, the output inductor may be 18 micro-Henry and the output capacitor may be 470 micro-Farads.

Embodiments in accordance with the foregoing may be used with, or incorporated into, a variety of electronic devices. As one example, an embodiment may be placed in a removable or portable storage device (such as a hard drive), television receiver (such as a set-top box, cable receiver, digital video recorder and so on), portable music player, mobile telephone and so forth.

All directional references (e.g. upper, lower, upward, downward, left, right, leftward, rightward, top, bottom, above, below, inner, outer, vertical, horizontal, clockwise and counterclockwise) are only used for identification purposes to aid the reader's understanding of examples of the invention, and do not create limitations, particularly as to position, orientation, or use of the invention unless specifically set forth in the claims. Joinder references (e.g. attached, coupled, connected, joined and the like) are to be construed broadly and may include intermediate members between a connection of elements and relative movement between elements. As such, joinder references do not necessarily infer that two elements are directly connected and in a fixed relation to each other.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. An apparatus for regulating a varying voltage supply, comprising:
- a first voltage node;
- a second voltage node;
- a gate device connected to the first voltage node and to the second voltage node, further connected to an output node;
- a switching element connected to the first voltage node, a feedback node and to ground;
- a current shunt connected to the first voltage node and the feedback node;
- a first resistive element connected to the feedback node and the output node;
- a second resistive element connected to the feedback node and ground, wherein the first resistive element and the second resistive element supply a feedback voltage to the switching element.

2. The apparatus for regulating a varying voltage supply of claim 1, wherein:
- when the switching element is on, the gate is in a first state;
- when the switching element is off, the gate is in a second state, when the gate is in the second state the voltage of the output node is equal to the voltage of the second voltage node.

3. The apparatus for regulating a varying voltage supply of claim 1, wherein the gate element is a transistor.

4. The apparatus for regulating a varying voltage supply of claim 1, wherein the switching element is a diode.

5. The apparatus for regulating a varying voltage supply of claim 1, wherein the switching element is a shunt regulator.

6. The apparatus for regulating a varying voltage supply of claim 1, wherein the voltage for the first voltage node and the second voltage node is from a power supply unit.

7. A voltage regulator for a multi-output power supply unit, comprising:
- a first voltage input connected to a first node;
- a comparison circuit connected to the first node, a second node, a third node, ground and a reference voltage;
- a gate device connected to the second node, the third node and a second voltage input;
- a resistive element connected to the first node and the second node;
- a current shunting element connected to the second node and a fourth node;
- a voltage divider connected to the third node and the fourth node, the voltage divider providing a first voltage to the comparison circuit, wherein
- the comparison circuit compares the first voltage to the reference voltage.

8. The voltage regulator of claim 7 wherein:

when the first voltage is greater than the reference voltage, the comparison circuit draws current from the second node through the current shunting element;

when the current shunting element draws current from the second node, the gate element switches to a first state;

when the gate element is in a first state an output voltage is the same value as the voltage of the second voltage input.

9. The voltage regulator of claim 8 wherein:

when the first voltage is less than or equal to the reference voltage, the comparison circuit stops current from flowing between the second node and the current shunting element;

when current stops flowing through current shunting element from the second node, the gate element switches to a second state;

when the gate element is in a second state an output voltage is linearly regulated.

10. The voltage regulator of claim 9 wherein the gate element is a transistor.

11. The voltage regulator of claim 8 wherein the comparison circuit further comprises:

a first transistor connected to the first node, the reference voltage and ground;

a second transistor connected to the second node, the third node, ground and the first transistor.

12. The voltage regulator of claim 8 wherein:

the first voltage input is connected to a first output from a power supply unit (PSU);

the second voltage input is connected to a second output from the PSU; and the reference voltage is supplied by a third output from the PSU.

* * * * *